P. MAUSER.
RECOIL LOADING PISTOL WITH FIXED BARREL.
APPLICATION FILED DEC. 9, 1909.
1,047,671. Patented Dec. 17, 1912.
6 SHEETS—SHEET 1.
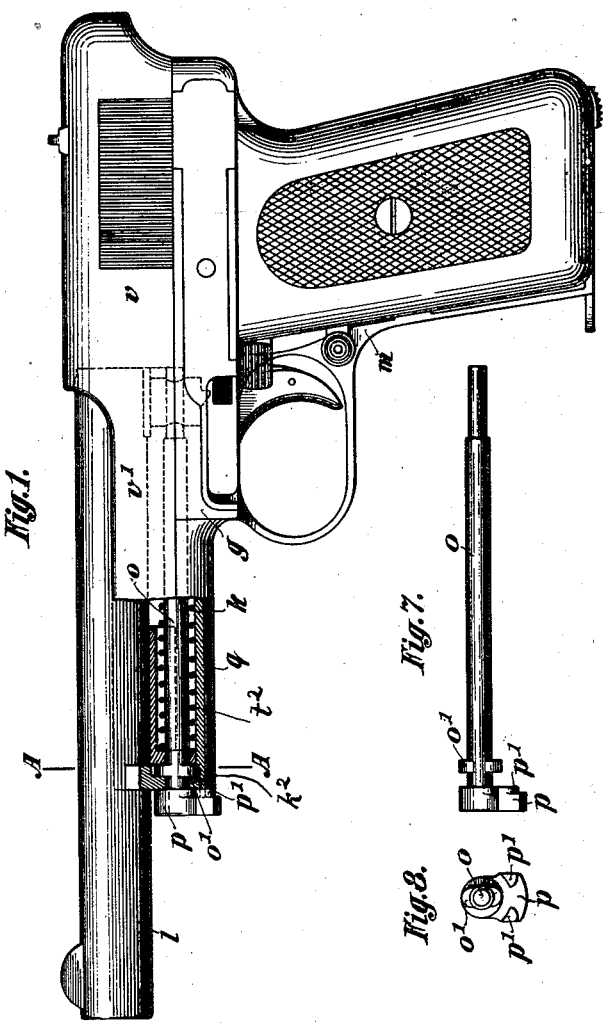
WITNESSES:
INVENTOR:
Paul Mauser,
By Attorneys;

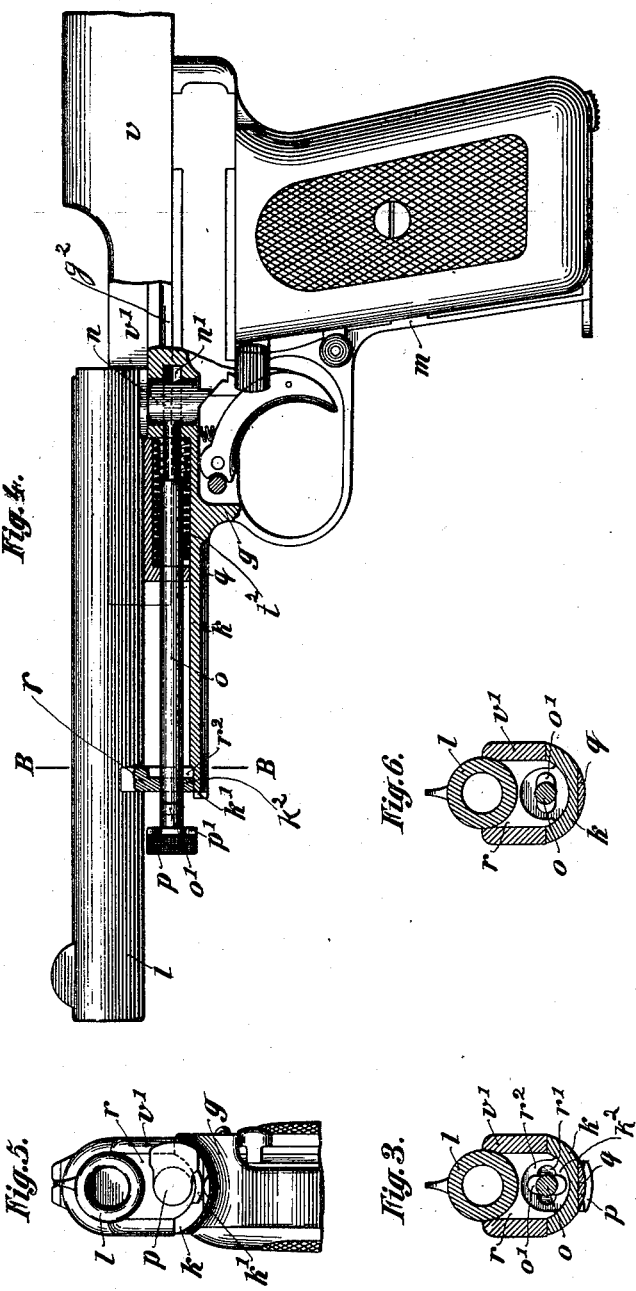

P. MAUSER.
RECOIL LOADING PISTOL WITH FIXED BARREL.
APPLICATION FILED DEC. 9, 1909.
1,047,671.
Patented Dec. 17, 1912.
6 SHEETS—SHEET 3.
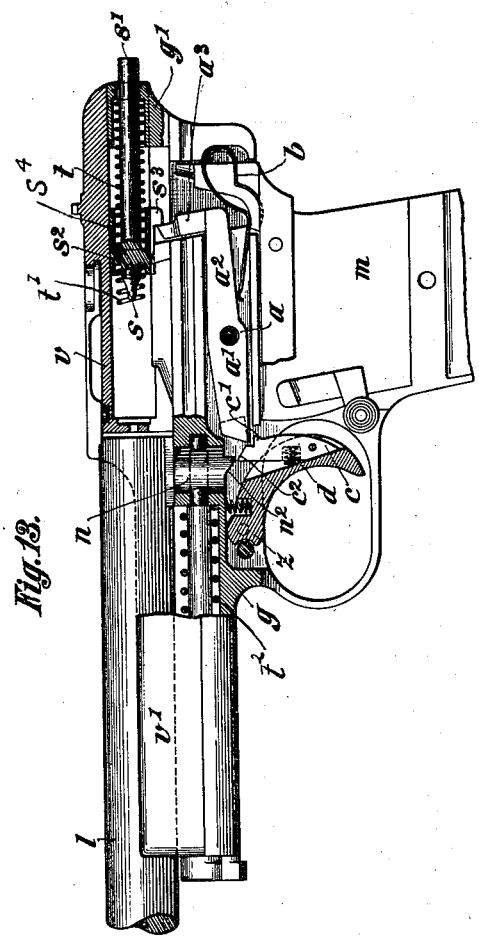
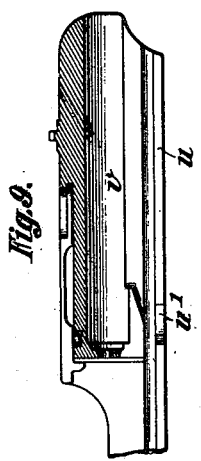
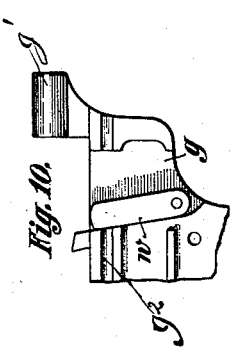
WITNESSES:
Fred White
René Bruine
INVENTOR:
Paul Mauser,
By Attorneys,
Arthur C. Fraser & Usina

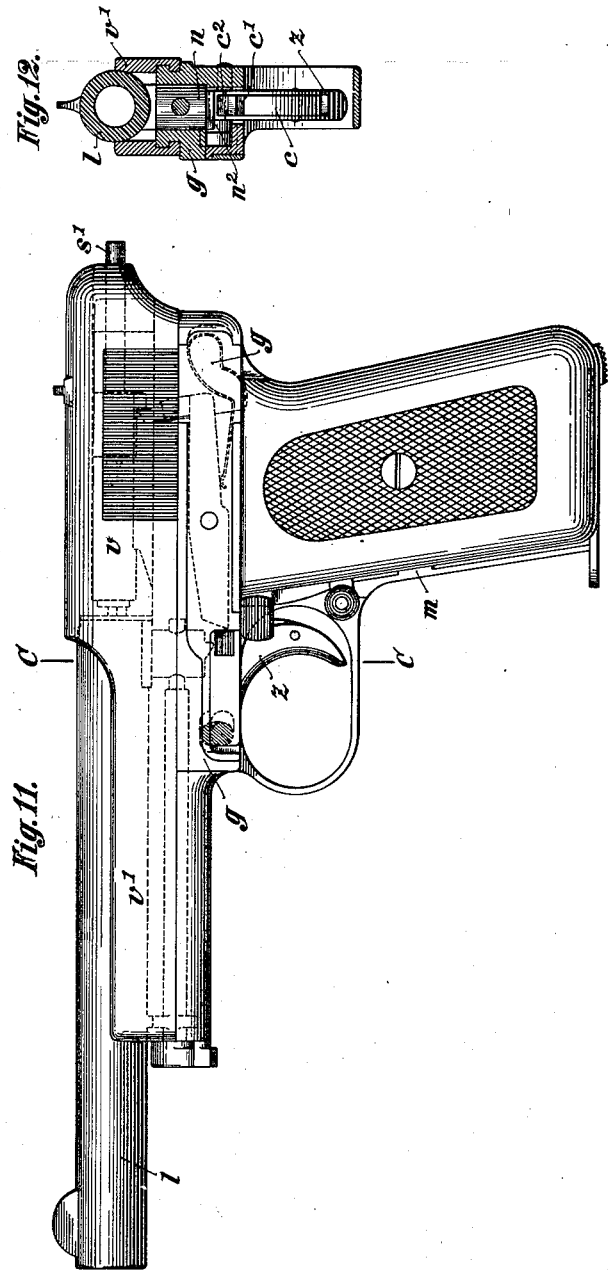

P. MAUSER.
RECOIL LOADING PISTOL WITH FIXED BARREL.
APPLICATION FILED DEC. 9, 1909.
1,047,671.
Patented Dec. 17, 1912.
6 SHEETS—SHEET 5.
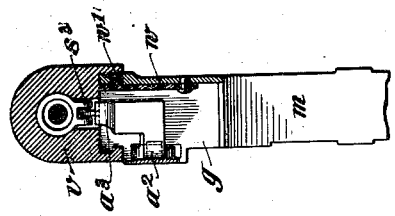
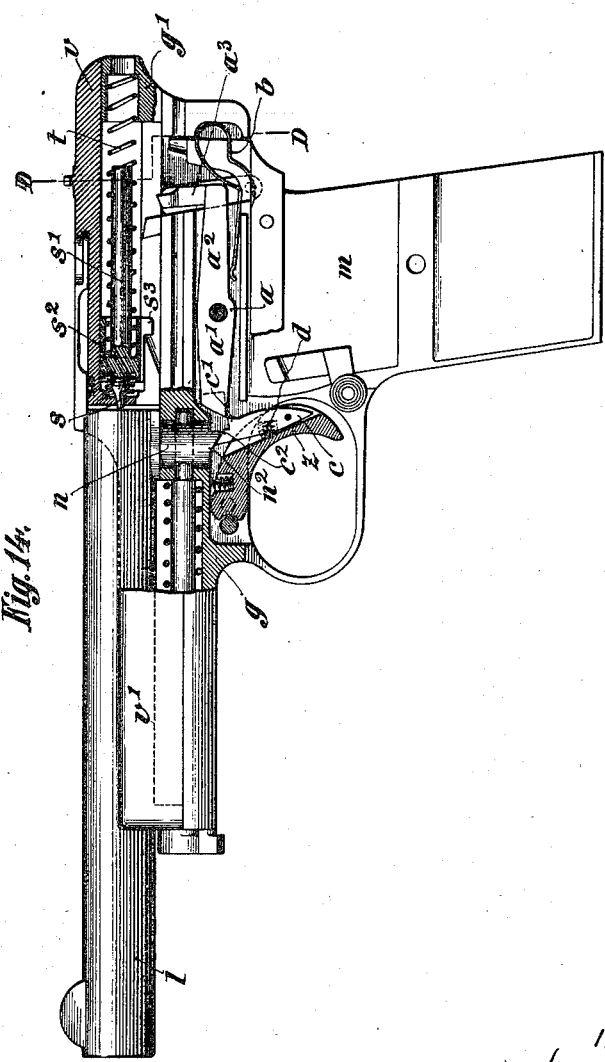
WITNESSES:
Fred White
Rene Bruine
INVENTOR:
Paul Mauser,
By Attorneys,
Arthur C. Fraser & Usina

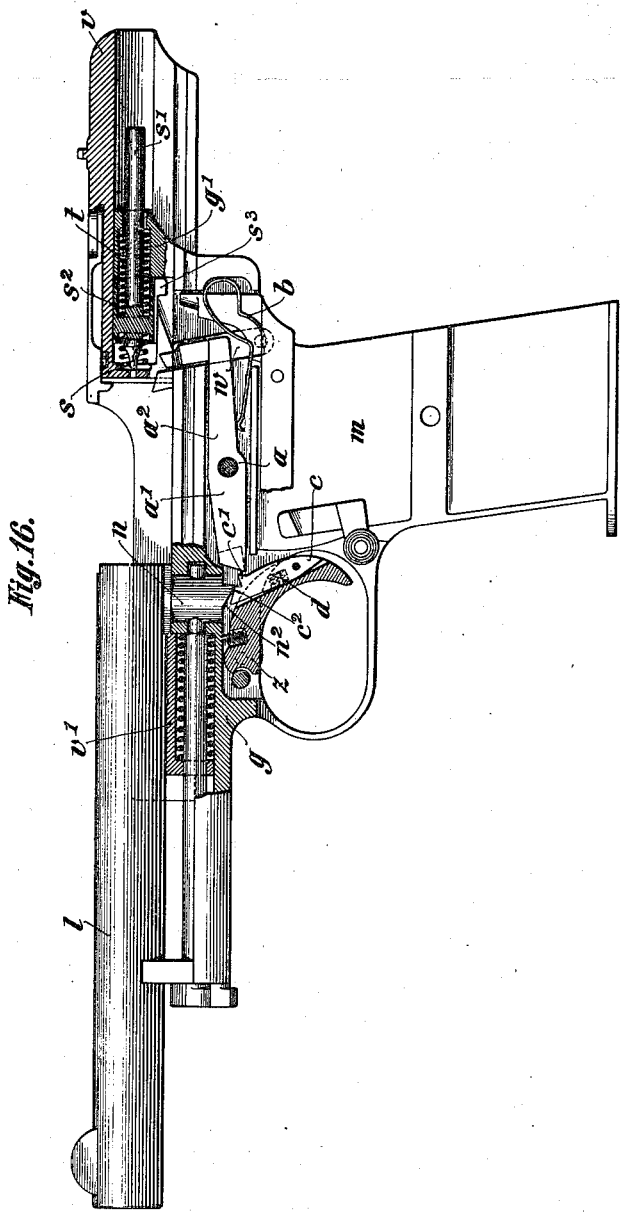

UNITED STATES PATENT OFFICE.

PAUL MAUSER, OF OBERNDORF-ON-THE-NECKAR, GERMANY.

RECOIL-LOADING PISTOL WITH FIXED BARREL.

1,047,671.  Specification of Letters Patent.  Patented Dec. 17, 1912.

Application filed December 9, 1909. Serial No. 532,198.

*To all whom it may concern:*

Be it known that I, PAUL MAUSER, subject of the King of Wurttemberg, residing at Oberndorf-on-the-Neckar, in the Kingdom of Wurttemberg, Germany, have invented new and useful Improvements in Recoil-Loading Pistols with Fixed Barrel, of which the following is a specification.

This invention relates to a recoil-loading pistol with fixed barrel and breech-slide guided on the grip-stock or handle, and to novel improvements in such a weapon, whereby especially a simplification of the same is attained and consequently the handling of the weapon, when dismounting and re-assembling the same, is facilitated. To this end, a novel fastening means for the barrel is provided, in which the barrel is held by a barrel holding device in the form of an insertible pin, after the removal of which, the barrel can be readily detached from the grip-stock or handle.

Moreover, the invention relates to the arrangement of the trigger mechanism, whose sear is not provided laterally on the magazine box but above the same in the upper part of the grip-stock or handle and consists of a double-armed bell crank lever, whose outwardly extending arm forms the trigger abutment pawl, whereas the trigger pawl proper is connected to the trigger itself.

Finally, an arrangement is provided for locking the breech-slide in the event of single loading and consists of a readily releasable spring locking piece or detent, which in the event of automatic loading is overcome by the recoil, but when the breech-slide is pulled by hand, it keeps the breech-slide open, the said detent being however also releasable by hand by a slight pressure or jerk.

A recoil-loading pistol embodying the aforesaid improvements is shown in the accompanying drawings, of which, Figures 1 and 2 are a side elevation and a front elevation respectively of the pistol, the front part of the barrel holding device being shown in section in Fig. 1; Fig. 3 is a vertical cross-section according to line A—A of Fig. 1, wherein the bayonet-joint like locking of the barrel holding device is shown; Fig. 4 shows the pistol with the barrel holding device in the released position, the insertible pin formed as barrel holding device being partly drawn out; Fig. 5 is a front elevation of Fig. 4; Fig. 6 is a vertical cross-section according to line B—B of Fig. 4; Figs. 7 and 8 are side elevation and front elevation respectively of the insertible pin; Figs. 9 and 10 show the means adapted for locking the breech-slide in the event of single loading; Fig. 11 is a side elevation of the weapon in readiness for firing, *i. e.*, with cocked hammer; Fig. 12 is a vertical cross-section according to line C—C of Fig. 11; Fig. 13 is a longitudinal section showing the arrangement and position of the parts of the firing mechanism in the weapon in readiness for firing; Fig. 14 shows the position of the parts after firing and at the moment when the trigger pawl is separated from the sear; Fig. 15 is a vertical cross-section according to line D—D of Fig. 14; Fig. 16 shows the weapon in an opened state with receded breech-slide and trigger pawl separated from the sear.

The weapon as shown comprises essentially the grip-stock $g$ whose handle proper forms the receiver $m$ for the insertible magazine, the breech-slide $v$ adapted to slide on the upper part of the grip-stock provided with corresponding guides and the barrel $l$ which is rigidly coupled with the grip-stock, and partly surrounded in its lower half by the front extension $v'$ of the breech-slide. The rear part of the breech-slide forms in the usual manner the breech bolt proper, which receives the firing pin $s$ the bore being closed rearwardly by the sleeve-shaped extension $a'$ of the grip-stock $g$ adapted to guide the rear part $s'$ of the firing pin.

The coupling of the barrel with the grip-stock is effected in the following manner: The barrel, which, as stated, is not surrounded by the front part of the breech-slide, but is practically only embedded therein, has a pin-like extension $n$ near to its rear end, which extension, when the barrel is mounted, as shown in Fig. 4, engages in a corresponding bore in the grip-stock. Farther forward on the barrel, there is a second extension $r$, which, with its lower part, bears in a groove $k^2$ at the front end of the ledge $k$ of the grip-stock and is provided with a rear milled part $r^2$ and an opening $r'$ widened on both sides in the transverse direction. There is provided as barrel holding device an insertible pin $o$ which is inserted through the opening $r'$ of the front barrel extension $r$ and also with its rear offset part through a transverse hole $n'$ of the barrel extension $n$, whereby the latter is fixed in its bore in the grip-stock. The insertible pin is secured in its coupled position by a double locking arrangement, as it engages on both sides with noses $p'$ at the rear of its extension $p$ under the shoulder $k'$ projecting from the front of the grip-stock ledge, and engages behind extension $r$ in the recess $r^2$ thereof with diametrically opposed cams $o'$ formed thereon farther toward its inner end. The insertible pin is further secured in this locking position in that the plate spring $q$ arranged underneath the grip-stock ledge $k$ engages with its front offset end in the space between the noses $p'$. These noses $p'$ are beveled, so that when coupling, i. e. when the insertible pin with its engaging extension is rotated, the catch spring may be pressed downward and thus released from its position of rest. Only a rotation at an angle of 90° is necessary for effecting this release and also for bringing the cams $o'$ out of their locking position (Fig. 3) into the unlocking position (Fig. 6) wherein the cams, with their longitudinal axis, are on a level with the laterally widened opening $r'$ of the extension $r$. The pin $o$ may thus be drawn out at the front and the barrel then removed from its bearing.

With regard to the arrangement of the trigger mechanism, it comprises essentially the sear $a$, which, in the form of a double-armed lever, is pivotally mounted laterally over the magazine box $m$ and forms with the trigger abutment lever $a^3$, a single rigid piece in the form of a bell crank lever, also the trigger pawl, $c$, which is attached directly to the trigger $z$ and extends with its upper beveled end $c^2$ within the range of a corresponding beveled shoulder $n^2$ of the aforesaid barrel extension $n$. There is provided beneath the beveled end $c^2$, an angular offset $c'$ with which, when the trigger is operated i. e. when the trigger is pulled, the trigger pawl $c$ engages around the front end of the arm $a'$ of the sear.

The arm $a^3$ of the sear $a$ acting as trigger abutment lever is inclined upward in such a manner that it extends with its upper end into the moving path of the abutment $s^3$, so that the firing pin $s$ may be arrested in the known manner when the sear with its bell crank lever $a^3$ is in the upper or arresting position caused by the plate spring $b$. When the trigger pawl $c$ engages with its offset $c'$ under the arm $a'$ of the sear, it lifts the same and thereby pulls the trigger abutment arm $a^3$ downward, so that the abutment $s^3$ is released and the cocked firing pin can advance for the purpose of firing. When further pulling the pawl, the upper beveled end $c^2$ slides upward on the shoulder $n^2$ of the barrel extension $n$ and the pawl is turned to such an extent that its offset $c'$ is removed from the front end of the lever arm $a'$. Thus no matter whether after firing, the trigger is still held tight, the sear will return to the upper or arresting position independently of the movement of the trigger pawl and under the influence of the spring $b$, so that when the breech-slide recoils, it comes in front of the abutment $s^3$ and thereby effects the locking of the firing pin. The trigger pawl $c$ is controlled by the spring $d$, which tends to keep the trigger pawl in the normal or engaging position as shown in Fig. 13 and to return the pawl to this normal position after its upper end has been released from the pin-like extension or shoulder, which readily takes place when releasing the trigger.

The firing pin $s$, which is guided rearwardly with its stem $s'$ in the sleeve-shaped end piece $g'$ has sleeve-shaped extensions on its plate $s^2$ forwardly and rearwardly, the latter extension of which receives the front end of the firing pin spring $t$ whereas the former extension in the form of a short edge is adapted to receive a small safety spring $t'$ holding the firing pin behind the front face of the breech bolt.

A spring detent $w$ (Figs. 10, 14, 15 and 16) is secured by a rivet or the like against the inner wall of the grip-stock over the magazine casing and extends with its locking projection $w'$ into a guiding groove $g^2$ of the grip-stock (Fig. 15). A ledge or strip $u$ of the breech slide slides in this groove $g^2$ and has a recess $u'$ (Fig. 9) on the inside, in which the projection $w'$ can enter under the influence of the elasticity of the spring detent $w$ when the breech slide is in its rearward position (Fig. 16).

The elasticity of the spring detent $w$ is so proportioned that the slide $v$ is held retracted when opened by hand against the pressure of the locking spring $t^2$. The slide can be readily released from the detent by slightly pushing upon the rear end of the breech slide. But when the slide is opened by the force of the explosion, i. e., in automatic loading, the movements of the slide are so rapid that the spring detent does not have time to overcome its moment of inertia and to enter with its projection $w'$ into the recess $w'$ of the ledge $u$ of the slide. The detent thus acts without any adjusting means to hold the slide retracted when opened by hand but to allow the free movement of the slide when opened by the force of explosion.

What I claim as my invention and desire to secure by Letters Patent is:—

1. In a recoil-loading pistol, the combination of a fixed barrel, a grip stock, a breech slide guided on said grip stock, said barrel having an extension at its rear end and said grip stock having a bore into which said extension passes, and a barrel-holding device secured to the grip stock.

2. In a recoil-loading pistol, the combination of a fixed barrel, a grip stock, a breech slide guided on said grip stock, said barrel having an extension at its rear end and said grip stock having a bore into which said extension passes, and a barrel-holding device secured to the grip stock, said barrel-holding device comprising a means extending through said extension and secured therein.

3. In a recoil-loading pistol, the combination of a fixed barrel, a grip stock, a breech slide guided on said grip stock, said barrel having an extension at its rear end and said grip stock having a bore into which said extension passes, and a barrel-holding device secured to the grip stock, said barrel-holding device comprising a means extending through said extension and secured therein by a removable catch device.

4. In a recoil-loading pistol, the combination of a fixed barrel, a grip stock, a breech slide guided on said grip stock, said barrel having an extension at its rear end and said grip stock having a bore into which said extension passes, and a barrel-holding device secured to the grip stock, said barrel-holding device comprising a means extending through said extension and secured therein by a removable catch device comprising a bayonet-joint.

5. In a recoil-loading pistol, the combination of a barrel, a grip stock, a trigger mechanism and a magazine, said trigger mechanism including a sear in the form of a double-armed lever disposed laterally over the magazine box, said sear having an upwardly extending rigid arm forming the trigger abutment lever, a trigger pawl coöperating therewith, a trigger tongue connected to said pawl and a fixed shoulder, said trigger pawl abutting against said shoulder after every pull of the trigger whereby the sear and trigger abutment lever are released.

6. In a recoil loading pistol, the combination of a fixed barrel, a grip stock and a breech slide guided on said grip stock, and means holding retracted said breech slide when opened by hand and being inoperative by its moment of inertia and without manipulation when the slide is opened by the force of the explosion.

7. In a recoil-loading pistol, the combination of a fixed barrel, a grip stock and a breech slide guided on said grip stock, and means for locking the breech slide for single loading and for allowing the free movement of the slide in automatic loading, said means comprising a spring detent arranged in the wall of the grip stock, having a locking projection which coöperates with a recess in the slide when the slide is opened by hand, but which is inoperative by its moment of inertia when the slide is opened by the force of expulsion.

8. In a firearm, the combination of a barrel having a projection thereon, a stock having a socket therein into which said projection is adapted to fit and means for connecting said barrel and stock together, said means comprising a part extending longitudinally of the barrel and projecting through said stock and into said projection when said projection is engaged within said socket.

9. In a firearm, the combination of a barrel having front and rear attaching projections thereon, a stock having a socket therein for one of said projections, and means for connecting said barrel and stock together, said means comprising a part extending longitudinally of the barrel and projecting through said stock and into said projections when said barrel is in position on the stock.

10. In a firearm, the combination of a barrel having front and rear attaching projections thereon, a stock having a socket therein for one of said projections, and means for connecting said barrel and stock together, said means comprising a part extending longitudinally of the barrel and projecting through said stock and into said projections when said barrel is in position on the stock and means for locking said connecting part in position.

11. In a firearm, the combination of a barrel having front and rear attaching projections thereon, a stock having a socket therein for one of said projections, and means for connecting said barrel and stock together, said means comprising a rotatable part extending longitudinally of the barrel and projecting through said stock and into said projections when said barrel is in position on the stock, means for locking said connecting part in position upon rotation of said part, and means for locking said part against rotation.

12. In a firearm, the combination of a barrel having front and rear attaching projections thereon, a stock having a socket therein for one of said projections, and means for connecting said barrel and stock together, said means comprising a part extending longitudinally of the barrel provided with an arm at its outer end, said part projecting through said stock and into said projections and said arm engaging the front end of the stock when the barrel is in position.

13. In a firearm, the combination of a barrel having front and rear attaching projections thereon, a stock having a socket therein for one of said projections, and means for connecting said barrel and stock together, said means comprising a part extending longitudinally of the barrel provided with an arm at its outer end, said part projecting through said stock and into said projections and said arm engaging the front end of the stock when the barrel is in position and means for locking said connecting part in position.

14. In a firearm the combination of a barrel having front and rear attaching projections thereon, a stock having a socket therein for one of said projections, and means for connecting said barrel and stock together, said means comprising a part extending longitudinally of the barrel provided with an arm at its outer end, said rotatable part projecting through said stock and into said projections and said arm engaging the front end of the stock when the barrel is in position and means for locking said connecting part in position upon rotation thereof.

15. In a firearm, the combination of a barrel having front and rear attaching projections thereon, a stock having a socket therein for one of said projections, and means for connecting said barrel and stock together, said means comprising a part extending longitudinally of the barrel provided with an arm at its outer end, said rotatable part projecting through said stock and into said projections and said arm engaging the front end of the stock when the barrel is in position, means for locking said connecting part in position upon rotation thereof and means for locking said part against rotation tending to unlock the same.

16. In a firearm, the combination of a barrel having front and rear attaching projections thereon, a stock having a socket therein for one of said projections, and means for connecting said barrel and stock together, said means comprising a part extending longitudinally of the barrel provided with an arm at its outer end, said rotatable part projecting through said stock and into said projections and said arm engaging the front end of the stock when the barrel is in position, means for locking said connecting part in position upon rotation thereof and a spring engaging said part for locking it against rotation.

17. In a firearm, the combination of a barrel having front and rear attaching projections thereon, a stock having a socket therein for one of said projections, and means for connecting said barrel and stock together, said means comprising a part extending longitudinally of the barrel provided with an arm at its outer end, said rotatable part projecting through said stock and into said projections and said arm engaging the front end of the stock when the barrel is in position, means for locking said connecting part in position upon rotation thereof and a spring upon the front end of the stock engaging said part for locking it against rotation.

18. In a firearm, the combination of a barrel having an attaching projection thereon, a stock having a socket therein for said projection, a reciprocating breech bolt, a spring for returning said breech bolt to closed position, and means for connecting said barrel and stock together, said means comprising a part extending longitudinally of the barrel and projecting through said stock through said returning spring and into said projection.

19. In a firearm, the combination of a barrel having an attaching projection thereon, a stock having a socket therethrough for said projection, means for connecting said barrel and stock together, a breech bolt, a firing mechanism, said mechanism comprising a spring-pressed firing-pin, a sear engaging said firing-pin, a trigger, a lever pivoted to said trigger engaging said sear and means upon said projection on the barrel for moving said lever out of engagement with said sear after said firing-pin has been released by said sear.

In testimony whereof I have signed my name to this specification in the presence of two subscribing witnesses.

PAUL MAUSER.

Witnesses:
ERNEST ENTENMANN,
PAULINE KLAIBER.